United States Patent
Bybee et al.

[11] Patent Number: 6,112,003
[45] Date of Patent: Aug. 29, 2000

[54] OPTICAL SCANNER HAVING MULTIPLE RESOLUTIONS

[75] Inventors: Jerry L. Bybee, Loveland; Gene Pien, Fort Collins; David W. Boyd, Greeley, all of Colo.

[73] Assignee: Hewlett-Packard Company, Palo Alto, Calif.

[21] Appl. No.: 09/143,307

[22] Filed: Aug. 28, 1998

[51] Int. Cl.[7] .................................................. G02B 6/06
[52] U.S. Cl. .......................... 385/116; 385/115; 385/120; 385/43; 385/901; 250/227.2; 250/227.26; 358/484
[58] Field of Search ...................................... 385/116, 120, 385/121, 43, 901, 115; 250/227.2, 227.26, 227.11, 227.12; 358/484

[56] References Cited

U.S. PATENT DOCUMENTS

| | | | |
|---|---|---|---|
| 3,739,095 | 6/1973 | Alden | 385/116 |
| 4,323,925 | 4/1982 | Abell | 358/213 |
| 4,760,421 | 7/1988 | Margolin | 355/1 |
| 4,932,747 | 6/1990 | Russell et al. | 350/96.24 |
| 5,155,790 | 10/1992 | Hwang | 385/121 |
| 5,594,828 | 1/1997 | Nielsen | 385/121 |
| 5,710,425 | 1/1998 | McConica et al. | 250/234 |
| 5,930,433 | 7/1999 | Williamson | 385/120 |

*Primary Examiner*—Cassandra Spyrou
*Assistant Examiner*—Leo Boutsikaris

[57] ABSTRACT

A multiple resolution scanner device for scanning an object may comprise a first optical wave guide bundle having a light input end, a light output end, and a first reduction ratio associated therewith. The light input end of the first optical wave guide bundle is arranged to receive image light from the object being scanned. A second optical wave guide bundle having a light input end and a light output end has a second reduction ratio associated therewith that is different than the first reduction ratio associated with the first optical wave guide bundle. The light input end of the second optical wave guide bundle is arranged to receive image light from the object being scanned. A detector positioned adjacent the light output ends of the first and second optical wave guide bundles receives image light from the light output ends and produces an image data signal related to image light received from the light output ends. An optical wave guide selection apparatus operatively associated with the scanner device selects an optical wave guide bundle, the image light from which is used by the detector to produce the image data signal.

19 Claims, 8 Drawing Sheets

OPTICAL SCANNER HAVING MULTIPLE RESOLUTIONS

FIELD OF INVENTION

This invention relates to image scanning devices in general and more specifically to image scanning devices having multiple scan resolutions.

BACKGROUND

Optical scanner devices are well-known in the art and produce machine-readable data signals representative of an object or document being scanned by projecting an image of the document onto a photosensitive detector. The electrical signals produced by the photosensitive detector may then be digitized and processed as necessary to produce an image of the scanned object on a suitable display device, such as, for example, the display of a personal computer. If the object being scanned is text, then the data signals may be converted into text data by a suitable optical character recognition (OCR) program or device.

A typical optical scanner may include illumination and optical systems to accomplish scanning of the object. The illumination system illuminates a portion of the object (referred to herein as a "scan region"), whereas the optical system collects light (referred to herein as "image light") reflected by the illuminated scan region and focuses a small area of the illuminated scan region (referred to herein as a "scan line") onto the surface of the photosensitive detector. By way of example, an optical scanner for scanning written documents may utilize a scan line having a length corresponding to the maximum expected document width, typically about 9 inches. Image data representative of the entire object may be obtained by sweeping the scan line across the entire object, usually by moving the illumination and optical systems with respect to the object, although the reverse is also possible.

By way of example, a typical scanner illumination system may include a light source (e.g., a fluorescent or incandescent lamp or an array of light emitting diodes (LEDs)). A typical scanner optical system may include a slit aperture and lens assembly to focus the image of the illuminated scan line onto the surface of the photosensitive detector. Depending on the particular design, the scanner optical system may also include a plurality of mirrors to "fold" the path of the image light, thereby allowing the optical system to be conveniently mounted within a relatively small enclosure. In order to allow a smaller photosensitive detector array to be used, most optical systems also reduce the size of the image of the scan line that is focused onto the surface of the detector. For example, many optical systems have a lens reduction ratio of about 8:1, which reduces the size of the image of the scan line by a factor of about 8.

The most common type of photosensitive detector device used in optical scanners is the charge coupled device or CCD, although other devices may also be used. A CCD may comprise a large number of light sensitive cells or "pixels," each of which collects or accumulates an electrical charge in response to exposure to light. Since the magnitude of the accumulated electrical charge in any given cell or pixel is related to the intensity and duration of the light exposure, a CCD may be used to detect light and dark spots on an image focused thereon. The charge accumulated in each of the CCD cells or pixels is measured and then discharged at regular intervals known as sampling intervals, which may be about 5 milliseconds or so, although other times may also be used.

The various light sensitive pixels of the CCD detector are typically arranged end-to-end so that they form a linear array of light sensitive pixels. Each pixel in the CCD array thus corresponds to a related pixel portion of the elongate scan line. The individual pixels in the linear array are generally aligned along a "cross" direction, i.e., a direction perpendicular to the direction of movement of the illuminated scan line across the object. The direction of movement of the illuminated scan line across the object is referred to herein as the "scan direction." Each pixel of the linear array thus has a length measured in the cross direction and a width measured in the scan direction. In most CCD arrays the length and width of the pixels are equal, typically being about 8 microns or so in each dimension.

As mentioned above, each pixel in the CCD array corresponds to a related pixel portion of the elongate scan line on the object. The corresponding pixel portion on the elongate scan line is referred to herein as an "native object pixel." A native object pixel has dimensions equal to the dimensions of the corresponding pixel on the linear photosensitive detector array multiplied by the lens reduction ratio of the optical system. For example, in a scanner having a CCD pixel size of 8 microns by 8 microns and a lens reduction ratio of 8:1, the size of the native object pixels will be about 64 microns by 64 microns. The linear array of native object pixels that corresponds to the linear array of CCD pixels is referred to herein as a "native scan line."

While optical scanners of the type described above are widely used, they are not without their disadvantages. For example, the optical systems used in such scanners generally employ several optical elements which may be expensive to manufacture and difficult to align. The lens assembly used to focus the image of the illuminated scan line onto the surface of the photosensitive detector may represent a significant portion of the overall cost of the scanner device. While low cost lens assemblies may be used, the cost savings usually comes at the expense of increased image aberrations, such as astigmatism, coma, etc., which generally decrease overall image quality. Many optical scanners also utilize one or more mirrors to fold the path of the image light. While such mirrors have the advantage of allowing the optical system to be mounted within a relatively small enclosure, they may be difficult to align and may impose strict geometrical relationships between the various components of the scanner.

Another disadvantage associated with the image scanning devices of the type described above is that they are generally only capable of scanning at one native resolution. While this limitation is generally acceptable for most scanning applications, it can be a decided disadvantage if the scanner device is to be used to scan an object that is substantially smaller than the length of the native scan line. For example, as mentioned above, the length of the native scan line in most scanner devices is about 9 inches. However, if it is desired to scan smaller objects, e.g., business cards, slides, small photographs, etc., then the effective resolution of the scanner will be reduced considerably since most of the pixels comprising the native scan line are not available for imaging the smaller object.

One solution to the foregoing problem would be to decrease the size of the native object pixels, thus increase the overall resolution of the scanner. Unfortunately, such high resolution scanners are expensive and require substantial increases in processing time and memory required to process the greatly increased amount of image data. Another solution to the problem would be to provide the scanner with two or more optical systems having different lens reduction ratios which correspond to different scan resolutions. In an alternative arrangement, a single zoom lens may be used to provide different lens reduction ratios, thus different resolutions. While such multiple resolution scanners do exist, the multiple lens and zoom lens optical systems tend to add significantly to the overall cost of the scanner.

Consequently, there remains a need for an optical scanner capable of scanning at two or more different resolutions to accommodate a wider range of object sizes, but without the disadvantages and expenses associated with currently available multiple resolution scanners. Ideally, such a scanner should utilize a relatively simple optical assembly, preferably eliminating the need for multiple lens and mirror systems, which can be complex, difficult to align, and costly.

SUMMARY OF THE INVENTION

A multiple resolution scanner device for scanning an object may comprise a first optical wave guide bundle having a light input end, a light output end, and a first reduction ratio associated therewith. The light input end of the first optical wave guide bundle is arranged to receive image light from the object being scanned. A second optical wave guide bundle having a light input end and a light output end has a second reduction ratio associated therewith that is different than the first reduction ratio associated with the first optical wave guide bundle. The light input end of the second optical wave guide bundle is arranged to receive image light from the object being scanned. A detector positioned adjacent the light output ends of the first and second optical wave guide bundles receives image light from the light output ends and produces an image data signal related to image light received from the light output ends. An optical wave guide selection apparatus operatively associated with the scanner device selects an optical wave guide, the image light from which is used by the detector to produce the image data signal.

Also disclosed is a method for scanning an object which comprises the steps of providing first and second optical wave guide bundles having different reduction ratios; positioning the light input ends of the first and second optical wave guide bundles adjacent the object to be scanned so that they receive image light therefrom; detecting image light from a selected one of the output ends of said first and second optical wave guide bundles; and producing an image data signal related to the detected image light.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
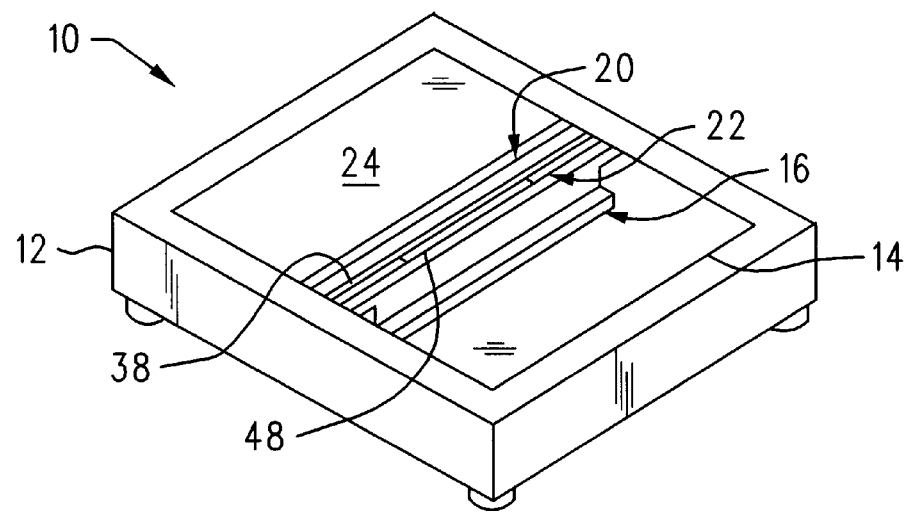
FIG. 1 is a perspective view of an optical scanner having multiple resolutions according to one embodiment of the present invention.

An optical scanner device 10 having multiple scan resolutions is shown in FIG. 1 and may comprise a "flatbed" type of configuration having a housing 12 with a transparent platen 14 provided thereon. A moveable carriage assembly 16 positioned underneath the transparent platen 14 (i.e., adjacent the back side 18 of transparent platen 14) may be provided with an illumination system 20 and an optical system 22 to accomplish scanning of an object (not shown) positioned on the front side 24 of the transparent platen 14. The housing 12 may also be configured to receive an image data pre-processing system 64 (FIG. 8) for producing selected image data 68 suitable for subsequent processing, such as, for example, by a general purpose programmable computer system (e.g., a PC, not shown) that may be connected to the optical scanner device 10.

Figure 2:
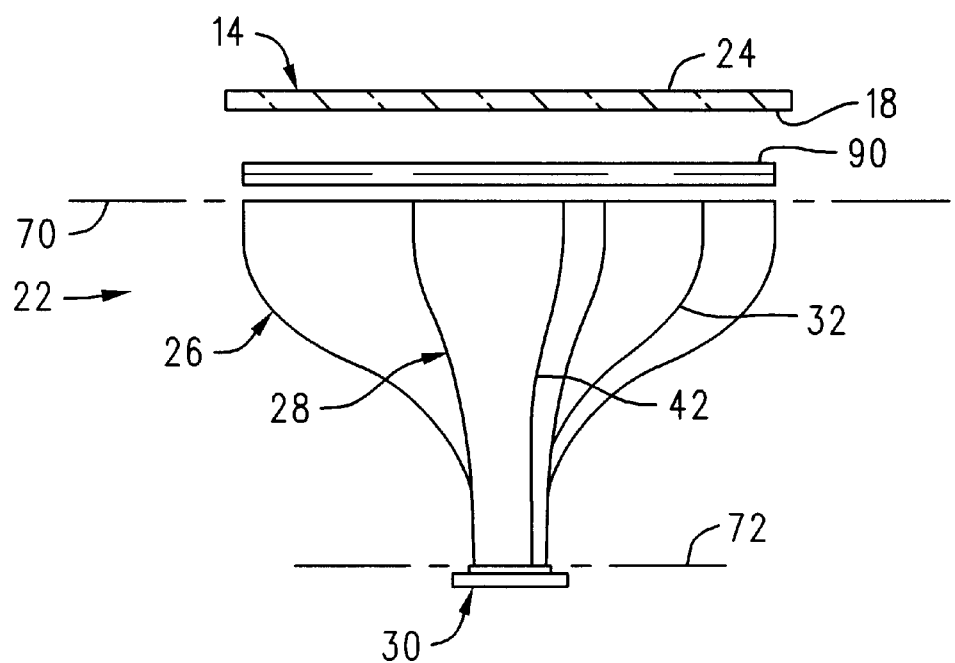
FIG. 2 is a schematic side view representation of a first embodiment of the optical system showing the arrangement of first and second optical wave guide bundles and a detector for detecting image light from the first and second optical wave guide bundles.
Figure 3:
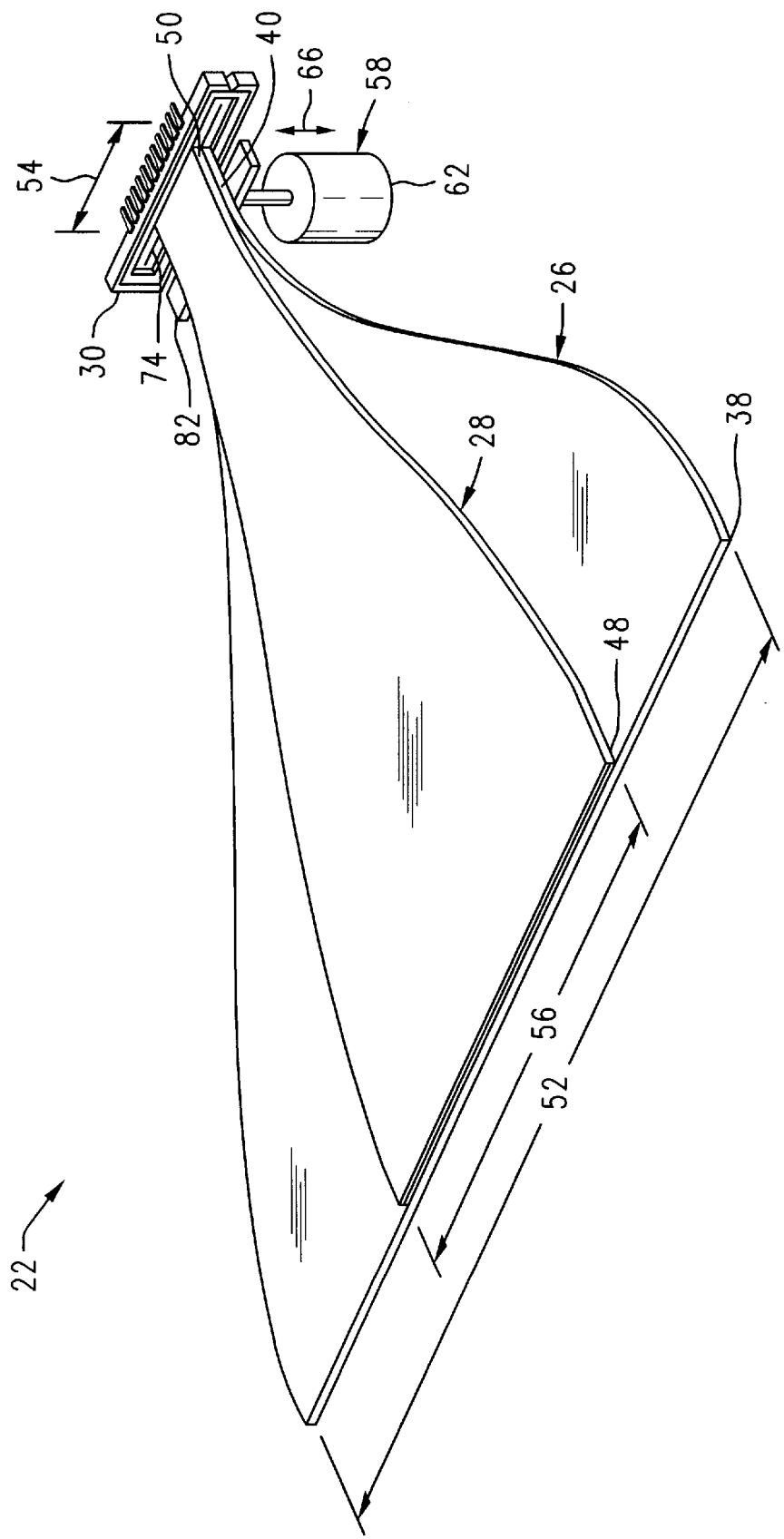
FIG. 3 is a perspective view of the first embodiment of an optical system showing the light output end selection apparatus for moving the light output ends of the first and second optical wave guide bundles with respect to the detector.

The optical system 22 is best seen in FIGS. 2 and 3 and may comprise a first optical wave guide bundle 26 and a second optical wave guide bundle 28, each of which is provided with a different reduction ratio. Each optical wave guide bundle 26, 28 directs image light (not shown) reflected by the illuminated scan region on the object (also not shown) onto the light sensitive cells or pixels of a light sensitive detector 30, such as a CCD, although other types of detectors may also be used. Since the reduction ratios of the first and second optical wave guide bundles 26 and 28 are different, each optical wave guide bundle 26, 28 provides a different scanning resolution. Accordingly, the object may be scanned at different resolutions depending on the particular optical wave guide bundle 26, 28 that is utilized to direct image light from the object to the detector. In one preferred embodiment, the optical system 22 may also include a cylindrical or rod lens assembly 90 (FIG. 2) to assist in directing image light (not shown) toward the first and second optical wave guide bundles 26 and 28. As will be described in greater detail below, the cylindrical lens assembly 90 narrows the field of view of the optical wave guide assemblies 26 and 28 in the "cross" direction (i.e., in the direction of movement of the scan line.

Figure 4:
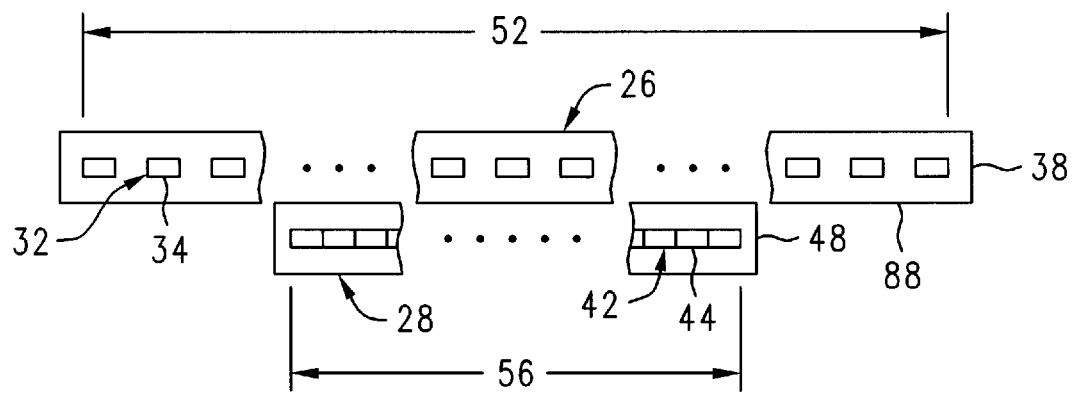
FIG. 4 is a schematic representation of the light input ends of the first and second optical wave guide bundles.

The first optical wave guide bundle 26 may comprise a plurality of wave guide elements 32 (only one of which is shown in FIG. 2), each of which includes a light input end 34 and a light output end 36. See FIGS. 4 and 5. The light input ends 34 of the wave guide elements 32 are arranged adjacent one another in a generally linear configuration so that the light input ends 34 define a linear light input end or line 38, as best seen in FIGS. 3 and 4. The light output ends 36 of the wave guide elements 32 are also arranged adjacent one another in a generally linear configuration so that the light output ends 36 define a linear light output end or line 40. See FIG. 5.

Figure 5:
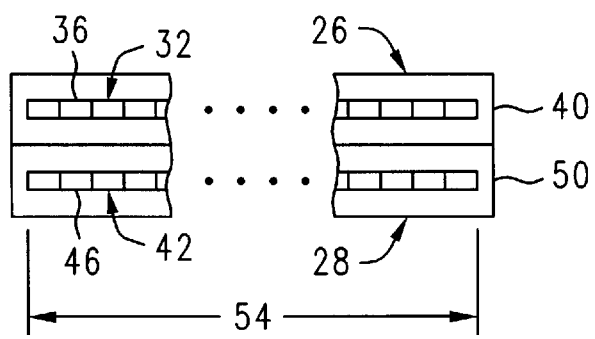
FIG. 5 is a schematic representation of the light output ends of the first and second optical wave guide bundles.

The second optical wave guide bundle 28 is similar to the first optical wave guide bundle 26 just described and may comprise a plurality of wave guide elements 42 (only one of which is shown in FIG. 2), each of which includes a light input end 44 and a light output end 46. The light input ends 44 of the wave guide elements 42 are arranged adjacent one another in a generally linear configuration so that the light input ends 44 define a linear light input end or line 48, as best seen in FIG. 4. The light output ends 46 of the wave guide elements 42 are also arranged adjacent one another in a generally linear configuration so that the light output ends 46 define a linear light output end or line 50, as best seen in FIG. 5.

As was briefly mentioned above, the first and second optical wave guide bundles 26 and 28 have different reduction ratios to provide different scanning resolutions. The different reduction ratios are a result of the different "fan-out" characteristics of the first and second optical wave guide bundles 26 and 28. For example, the light input ends 34 of the wave guide elements 32 comprising the first optical wave guide bundle 26 may be generally evenly spaced from one another so that the linear light input end 38 extends along a length 52, as best seen in FIGS. 3 and 4. The length 52 of the linear light input end 38 defines the length of the native scan line (not shown) associated with the first optical wave guide bundle 26. The light output ends 36 of the wave guide elements 32 comprising the first optical wave guide bundle 26 are brought together in a much more tightly packed arrangement than the light input ends 34 so that the linear light output end 40 extends along a length 54, as best seen in FIG. 5. The ratio of the lengths 52 and 54 define the reduction ratio of the first optical wave guide bundle 26.

The second optical wave guide bundle 28 comprises a similar configuration, except that the light input ends 44 of the wave guide elements 42 comprising the second optical wave guide bundle 28 are spaced so that the linear light input end 48 extends along a length 56. See FIGS. 3 and 4. The length 56 of the linear light input end 48 defines the length of the native scan line (not shown) associated with the second optical wave guide bundle 28. The light output ends 46 of the wave guide elements 42 comprising the second optical wave guide bundle 28 are brought together so that the linear light output end 50 extends along a length 54, as best seen in FIGS. 3 and 5. The ratio of the lengths 56 and 54 define the reduction ratio of the second optical wave guide bundle 28.

In order to accomplish scanning at the two different resolutions provided by the two different reduction ratios associated with the first and second optical wave guide bundles 26 and 28, the scanner assembly 10 is also provided with an optical wave guide selection apparatus 58 which selects one of the two optical wave guide bundles 26, 28, the image light from which is used by the detector 30 to produce an image data signal 60 (FIG. 8) representative of the scanned object at the selected resolution.

Referring now to FIG. 3, in one preferred embodiment, the optical wave guide selection apparatus 58 may comprise a light output end actuator 62 operatively associated with the linear light output ends 40 and 50 of the first and second optical wave guide bundles 26 and 28. The light output end actuator 62 moves the light output ends 40 and 50 in the direction of arrows 66 to align a selected light output end 40, 50 with the detector 30. The image data signal 60 produced by the detector assembly 30 will then be representative of the object (not shown) scanned at the resolution which corresponds to the optical wave guide bundle 26, 28 associated with the selected light output end 40, 50. The scanner device 10 may also be provided with an image data pre-processing system 64 shown in FIG. 8. The image data pre-processing system 64 may be operatively associated with the detector 30 and processes the image data 60 produced by the detector 30 to produce selected image data 68 suitable for subsequent processing. The selected image data 68 is representative of the scanned object at the selected resolution.

The first and second optical wave guide bundles 26 and 28, along with detector assembly 30 and, optionally, the image data pre-processing system 64, may be mounted within the moveable carriage 16 (FIG. 1) so that the linear light input ends 38 and 48 of the respective optical wave guide bundles 26 and 28 are positioned adjacent the back side 18 of the transparent platen 14. See FIG. 2. The object (not shown) may then be scanned in its entirety by moving the carriage in the scan direction in the conventional manner.

The scanner 10 may be operated as follows to scan an object (not shown) positioned adjacent the front side 24 of the transparent platen 14. Assuming that the operator (not shown) has attended to all the preliminary matters that may be required by the particular scanner operating system, the operator may thereafter select the desired scanning resolution. In the case of the embodiment shown and described herein, the operator may select between a low resolution setting (available by using the first optical wave guide bundle 26) and a high resolution setting (available by using the second optical wave guide bundle 28). After the operator has selected the desired resolution, the optical wave guide selection apparatus 58 operates the light output end actuator 62 as necessary to move the light output ends 40 and 50 of the optical wave guide bundles 26 and 28 so that the light output end 40, 50 corresponding to the selected scan resolution is aligned with the detector 30. For example, if the operator selects the low resolution setting, the light output end actuator 62 positions the light output ends 40, 50 of the optical wave guide bundles 26, 28 so that the light output end 40 is aligned with the detector 30. Alternatively, if the operator selects the high resolution setting, the light output end actuator 62 positions the light output ends 40, 50 so that the light output end 50 is aligned with the detector 30. Thereafter, the object may be scanned by activating the illumination system 20 and by moving the carriage assembly 16 in the scan direction to scan the object (not shown) positioned on the platen 14. The image data signal 60 produced by the detector 30 may be processed, if desired, by the image data pre-processing system 64 (FIG. 8) to produce selected image data 68 suitable for subsequent processing by a suitable image data processing system, such as may be provided on a separate computer system (not shown) that may be connected to the scanner device 10. The selected image data 68 are representative of the scanned object at the selected resolution.

A significant advantage associated with the optical scanner 10 according to the present invention is that it provides for multiple scanning resolutions while at the same time dispensing with the need to use expensive and cumbersome lens and mirror assemblies to provide the multiple reduction ratios required to accomplish scanning at multiple resolutions. The optical wave guide bundles also allow the detector assembly 30 to be placed at almost any position within the scanner 10, thereby removing a significant number of geometrical constraints that may otherwise be associated with scanner devices that utilize lens and mirror optical systems to direct the image light toward the detector. The optical wave guide bundles also tend to be very robust, thereby reducing the chances that physical shocks or rough handling of the scanner will upset the alignment of the optical system.

Having briefly described the optical scanner 10 according to the present invention, as well as some of its more significant features and advantages, various exemplary embodiments of the invention will now be described in detail. However, before proceeding with the description, it should be noted that while the optical scanner device 10 is shown and described herein as it could comprise a "flatbed" type of scanner configuration, it could also comprise other types of configurations, such as "sheet-feed" type configurations wherein the document to be scanned is moved in relation to a stationary optical system. In still another alternative configuration, the optical scanner device may also comprise a hand-held type of scanner configuration. Consequently, the present invention should not be regarded as limited to the particular configurations and applications shown and described herein.

With the foregoing considerations in mind, one embodiment of an optical scanner device 10 according to the present invention may comprise a "flatbed" type of configuration having a generally rectangularly shaped housing 12 provided with a transparent platen 14 thereon. In accordance with the flatbed configuration, the housing 12 may also be provided with a cover (not shown) which may be used to cover the entirety of the platen 14 during the scanning operation. The housing 12 may also be provided with various types of displays and switching devices (not shown) to allow an operator (not shown) to control the function and operation of the scanner device 10. However, since such ancillary devices, such as platen covers, switches, and displays are well-known in the art and are not required to understand or practice the present invention, the various ancillary devices that may be required or desired for a particular application or for use with a particular scanner apparatus, will not be described in further detail herein.

The scanner device 10 may be provided with a carriage assembly 16 that may be slidably mounted within the housing 12 to accomplish scanning of the desired object. The carriage assembly 16 may be moved back and forth underneath the transparent platen 14 by any of a wide range of actuator systems that are well-known in the art for moving carriages of flatbed type scanners. Here again, since carriage assemblies and carriage actuator systems are well-known in the art and are not required to understand or practice the present invention, the particular carriage assembly 16 and carriage actuator system (not shown) utilized in one preferred embodiment of the invention will not be described in further detail.

The carriage assembly 16 may be provided with an illumination system 20 to illuminate a scan region (not shown) on the object being scanned. The illumination system 20 may comprise any of a wide range of light sources, such as fluorescent or incandescent lamps, or an array of light emitting diodes (LEDs), that are readily commercially available and well-known in the art for such applications. By way of example, in one preferred embodiment, the illumination system 20 may comprise an array of LEDs.

The carriage assembly 16 may also be provided with an optical system 22 for collecting image light (not shown) reflected by the illuminated scan region (also not shown) and directing it toward a suitable detector 30. Referring now to FIGS. 2–5 simultaneously, one embodiment of the optical system 22 may comprise a first optical wave guide bundle 26 and a second optical wave guide bundle 28. The first optical wave guide bundle 26 may comprise a plurality of wave guide elements 32 (only one of which is shown in FIG. 2). Each wave guide element 32 includes a light input end 34 and a light output end 36 and transmits light from the light input end 34 to the light output end 36 by means of total internal reflection. The light input ends 34 of the wave guide elements 32 are essentially co-planar with a light input plane 70 and are arranged adjacent one another in a generally linear configuration so that the light input ends 34 define a linear light input end or line 38. The light output ends 36 of the wave guide elements 32 are essentially co-planar with a light output plane 72 and are also arranged adjacent one another in a generally linear configuration so that the light output ends 36 define a linear light output end or line 40 (FIG. 5).

The second optical wave guide bundle 28 is similar to the first optical wave guide bundle 26 and may comprise a plurality of wave guide elements 42 (only one of which is shown in FIG. 2), each of which includes a light input end 44 and a light output end 46. The light input ends 44 of the wave guide elements 42 are essentially co-planar with the light input plane 70 and are arranged adjacent one another in a generally linear configuration so that the light input ends 44 define a linear light input end or line 48. The light output ends 46 of the wave guide elements 42 are essentially co-planar with the light output plane 72 and are also arranged adjacent one another in a generally linear configuration so that the light output ends 46 define a linear light output end or line 50.

The first and second optical wave guide bundles 26 and 28 have different reduction ratios to provide different scanning resolutions. The different reduction ratios are a result of the different "fan-out" characteristics of the first and second optical wave guide bundles 26 and 28. For example, the light input ends 34 of the wave guide elements 32 comprising the first optical wave guide bundle 26 are spaced so that the linear light input end 38 extends along a length 52, as best seen in FIGS. 3 and 4. The length 52 of the linear light input end 38 defines the length of the native scan line (not shown) associated with the first optical wave guide bundle 26. The light input ends 34 may be arranged to define a linear light input end 38 having any of a wide range of lengths 52. By way of example, in one preferred embodiment, the linear light input end 38 may have a length 52 in the range of about 8.5 inches to about 12 inches (9 inches preferred), although other lengths may also be used.

The light output ends 36 of the wave guide elements 32 comprising the first optical wave guide bundle 26 are brought together so that they define a linear light output end 40. Linear light output end 40 extends along a length 54 that is substantially co-extensive with the linear array 74 of light sensitive elements provided on the detector 30. Accordingly, the length 54 of the linear light output end 40 may comprise any of a wide range of lengths depending on the particular type of detector 30 that is to be utilized. Consequently, the present invention should not be regarded as limited to a linear light output end 40 having any particular length 54. By way of example, in one preferred embodiment, the length 54 of the linear light output end 40 may be in the range of about 0.8 inches to about 2.75 inches (1.7 inches preferred).

The ratio of the lengths 52 and 54 define the reduction ratio of the first optical wave guide bundle 26. The reduction ratio of the first optical wave guide bundle 26 may be selected to be any of a wide range of ratios depending on the particular application, the desired resolution, and the particular detector 30 that is to be utilized. Consequently, the present invention should not be regarded as limited to a first optical wave guide bundle 26 having any particular reduction ratio. By way of example, in one preferred embodiment, the first optical wave guide bundle 26 may have a reduction ratio in the range of about 5.3:1 to about 12:1 (5.3:1 preferred).

The number of wave guide elements 32 required for the first optical wave guide bundle 26 will vary depending on a number of factors, including, without limitation, the desired length 52 of the linear light input end 38, the desired length 54 of the linear light output end 40, and on the sizes of the individual wave guide elements 32. By way of example, in one preferred embodiment, the first optical wave guide bundle 26 may comprise about 5,400 individual wave guide elements 32.

Figure 6:
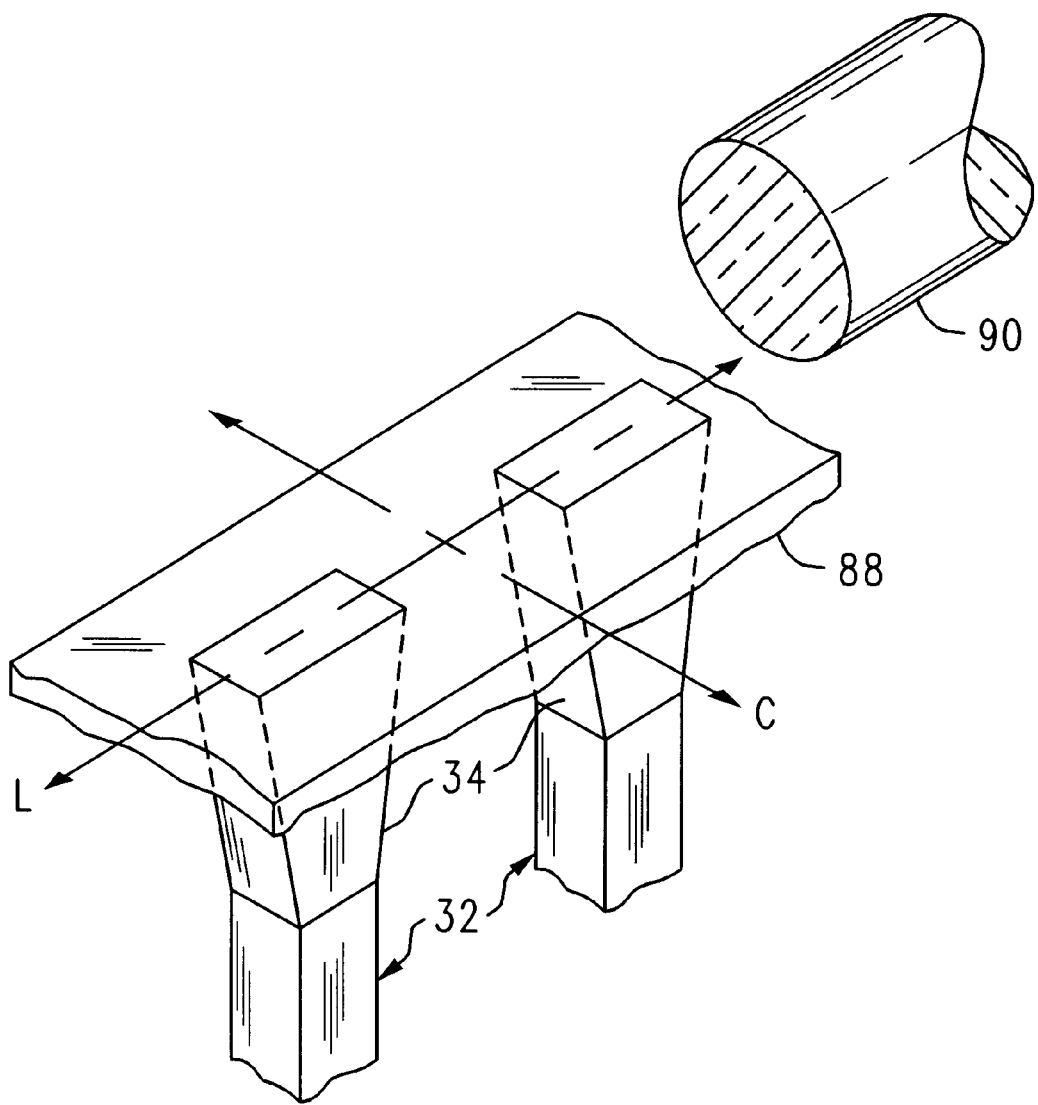
FIG. 6 is a perspective view of the input ends of two optical wave guide elements comprising the first optical wave guide bundle.
Figure 7:
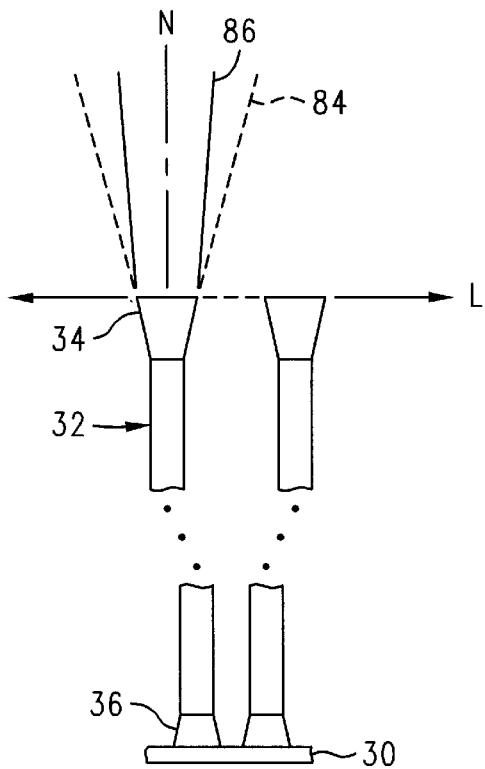
FIG. 7 is a schematic view in elevation showing how the flared light input end of an optical wave guide element may be used to reduce the field of view of the optical wave guide element.

The various wave guide elements 32 may comprise any of a wide range of optical wave guide elements for transmitting light by means of total internal reflection. Referring now primarily to FIGS. 6 and 7, the light input end 34 of each wave guide element 32 may be flared to reduce the effective aperture or "field of view" of the wave guide element in the scan line direction L (i.e., along the length of the scan line). The flared input end 34 reduces the effective aperture or field of view of the wave guide element 32 in the scan line direction L from a wide field 84 to a narrow field of view 86. Essentially, light rays incident on the light input end 34 at large angles with respect to the normal N (e.g., coincident with line 84) are generally reflected in the flared input end 34 a number of times. With each reflection, the angle of incidence of such a large angle ray increases until the angle of incidence exceeds the critical angle required for total internal reflection. Consequently, any such large angle rays eventually escape the optical wave guide element 32. In one embodiment, the flared input end 34 may be provided with a light-absorbing coating (not shown) to absorb any such large angle rays that escape from the optical wave guide element 32.

Since the light input end 34 of optical wave guide element 32 is only flared in one direction (e.g., in the scan line direction L) it will only limit the field of view of the optical wave guide element 32 in the scan line direction L. See FIG. 6. If it is desired or required to also limit the field of view of the optical wave guide element in the perpendicular direction (e.g., in the "cross" direction C) the optical system 22 may be provided with a cylindrical or rod lens assembly 90. Essentially, the cylindrical or rod lens assembly 90 extends along the scan line direction L and functions to narrow the field of view of the light input ends 34 of the optical wave guide elements 32 in the cross direction C. The cylindrical lens assembly 90 may be provided with a "power" appropriate for achieving any of a wide range of field of view reductions that may be required or desired for a particular optical system 22. However, since cylindrical or rod lens assemblies are well-known in the art and could be easily provided by persons having ordinary skill in the art after becoming familiar with the teachings of the present invention, the particular cylindrical or rod lens assembly 90 utilized in one preferred embodiment will not be described in further detail herein.

The light output end 36 of each wave guide element 32 may also be flared, although it is not required. If the light output end 36 of each wave guide element 32 is flared, the flare has the effect of collimating the light emerging from the light output end 36, thereby preventing the light from illuminating adjacent cells or pixels of the detector 30. The reduction in field of view provided by the flared light input end 34, cylindrical or rod lens assembly 90, and the collimation provided by the flared light output end 36 significantly reduces the amount of image "cross talk" between adjacent wave guide elements 32, which substantially improves image quality.

In another embodiment, the wave guide elements 32 may comprise an optic fiber of the type shown and described in U.S. Pat. No. 5,594,828 which is incorporated herein by reference for all that it discloses. Briefly, the foregoing U.S. patent discloses an optic fiber having a light absorbing sheath located at the light input end of the optic fiber. The light absorbing sheath reduces the effective aperture or field of view of the fiber which significantly reduces the amount of image cross talk between adjacent fibers. The reduced image cross talk results in a substantial increase in resolution.

The individual wave guide elements 32 comprising the first optical wave guide bundle 26 may be secured together by any of wide range of devices capable of holding the light input ends 34 together so that they are substantially co-planar with the light input plane 70 and so that they define the linear light input end 38. By way of example, in one preferred embodiment, the light input ends 34 of the wave guide elements 32 may be encapsulated in a main body portion 88 which provides mechanical stability and secures together the wave guide elements 32 so that the light input ends 34 and light output ends 36 define the geometry shown and described herein. While any of a wide range of materials may be used to encapsulate the various wave guide elements 32, by way of example, in one preferred embodiment, the main body portion 88 may comprise a polymer material, such as polyethylene terephalate (PET), although other materials, such as epoxy, may also be used.

The second optical wave guide bundle 28 may comprise a similar configuration to the first optical wave guide bundle 26 just described, except that the light input ends 44 of the wave guide elements 42 comprising the second optical wave guide bundle 28 are spaced so that the linear light input end 48 extends along a length 56 which is different from the length 52 of the linear light input end 38 of the first optical wave guide bundle 26. The length 56 of the linear light input end 48 defines the length of the native scan line (not shown) associated with the second optical wave guide bundle 28. The length 56 of the linear light input end 48 may comprise any of a wide range of lengths depending on the particular application, the desired resolution, and the type of detector 30 that is to be used. Accordingly, the present invention should not be regarded as limited to any particular length 56 of the linear light input end 48. However, by way of example, in one preferred embodiment, the linear light input end 48 may have a length 56 in the range of about 4.25 inches to about 6 inches (4.5 inches preferred), although other lengths may also be used.

The light output ends 46 of the wave guide elements 42 comprising the second optical wave guide bundle 28 are brought together so that the linear light output end 50 extends along the length 54. As was mentioned above, it is generally preferred that the length 54 be substantially co-extensive with the length of the linear array 74 associated with the detector 30. Accordingly, the length 54 of the linear light output end 50 may comprise any of a wide range of lengths described above, depending on the particular type of detector 30 that is to be utilized.

The ratio of the lengths 56 and 54 define the reduction ratio of the second optical wave guide bundle 28. As was the case for the first optical wave guide bundle 26, the reduction ratio of the second optical wave guide bundle 28 may be selected to be any of a wide range of ratios depending on a wide variety of factors, including, without limitation, the particular application, the desired resolution, and the type of detector 30. Consequently, the present invention should not be regarded as limited to a second optical wave guide bundle 28 having any particular reduction ratio. By way of example, in one preferred embodiment, the second optical wave guide bundle 28 may have a reduction ratio in the range of about 2.64:1 to about 6:1 (2.64:1 preferred).

The number of wave guide elements 42 required for the second optical wave guide bundle 28 will vary depending on a wide range of factors, including, without limitation, the desired length 56 of the linear light input end 48, the desired length 54 of the linear light output end 50, and the sizes of the light input ends 44 and light output ends 46 of the individual wave guide elements 42. By way of example, in one preferred embodiment, the second optical wave guide bundle 28 may comprise about 5,400 individual wave guide elements 42. The wave guide elements 42 may be identical to the wave guide elements 32 described above and may be bonded together utilizing the materials and methods described above.

The detector assembly 30 used to detect the image light emerging from the light output ends 40, 50 of the first and second optical wave guide bundles 26 and 28 may comprise a single linear array 74 of light sensitive elements or pixels, as best seen in FIG. 3. For clarity and ease of illustration, the linear array 74 is shown in FIG. 3 as extending beyond the bounds of the light output ends 40 and 50. However, as was mentioned above, it is generally preferred that the lengths 54 of the light output ends 40 and 50 be substantially equal to the length of the linear array 74 of the detector 30. The detector 30 may comprise any of a wide range of photosensitive detectors that are readily commercially available. By way of example, in one preferred embodiment, the detector 30 may comprise a CCD detector comprising 5,400 light sensitive pixels of the type that are readily commercially available. Alternatively, other types of detectors, such as active pixel CMOS devices, could also be used.

Figure 8:
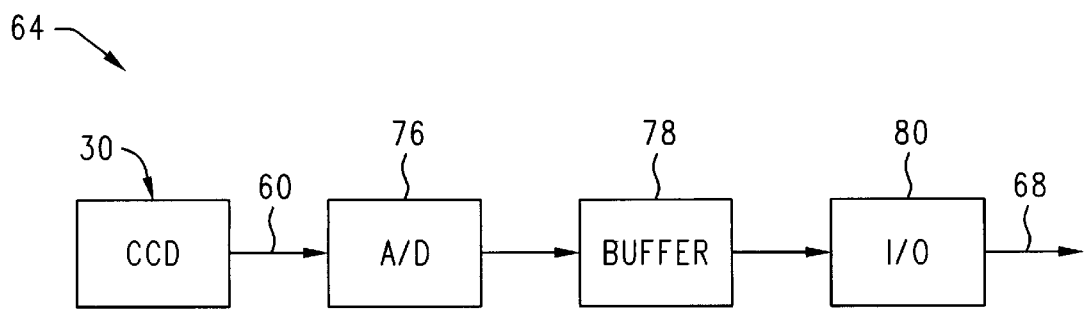
FIG. 8 is a block diagram of a first embodiment of an image data pre-processing system.

Referring now to FIG. 8, the scanner device 10 may also be provided with an image data pre-processing system 64 to process the image data 60 produced by the detector or CCD 30. The image data pre-processing system 64 produces selected image data 68 suitable for subsequent processing. The selected image data 68 corresponds to the particular resolution selected by the user. By way of example, in one preferred embodiment, the image data pre-processing system 64 may comprise an analog-to-digital (A/D) converter 76 connected to the detector 30 and responsive to image data 60 produced thereby. The A/D converter 76 operates in a conventional manner to convert the analog signals produced by the detector 30 to digital signals that can be stored and processed by conventional digital data processing circuits. The image data pre-processing system 64 may also be provided with a buffer circuit 78 and an input/output (i.e., I/O) circuit which places the selected image data 68 in a form suitable for use by a subsequent image processing system. The various components (i.e., the A/D converter 76, buffer 78, and I/O circuit 80) of the image data processing circuit 64 may comprise any of a wide range of components that are well-known in the art and readily commercially available. Consequently, the various components (e.g., A/D converter 76, buffer 78, and I/O circuit 80) that may be utilized in one preferred embodiment of the invention will not be described in further detail herein.

As described above, the scanner device 10 also includes an optical wave guide selection apparatus 58 to accomplish scanning at the two different resolutions provided by the two different reduction ratios associated with the first and second optical wave guide bundles 26 and 28. The optical wave guide selection apparatus 58 selects one of the two optical wave guide bundles 26, 28, the image light from which is used by the detector 30 to produce an image data signal 60 (FIG. 8) representative of the scanned object.

Referring now to FIG. 3, one embodiment of the optical wave guide selection apparatus 58 may comprise a light output end actuator 62 connected to a support member 82. Support member 82 may be affixed to the linear light output end 40 of the first optical wave guide bundle 26, although other arrangements could also be used. The actuator assembly 62 moves the linear light output ends 40 and 50 together in the direction of arrow 66 to align one or the other of the linear light output ends 40 and 50 with the linear array 74 of light sensitive elements on the detector 30. For example, when the actuator 62 moves the light output ends 40 and 50 to a lower position, the light input end 50 of the second optical wave guide bundle 28 will be aligned with the linear array 74. Accordingly, the linear array 74 will receive image light only from the second optical wave guide bundle 28. This condition is illustrated in FIG. 3 and corresponds to the high resolution setting. Alternatively, when the actuator 62 moves the light output ends 40, 50 to an upper position, the light output end 50 of the first optical wave guide bundle 26 will be aligned with the linear array 74. In this configuration, the linear array 74 will receive image light only from the first optical wave guide bundle 26. This configuration corresponds, then, to the low resolution setting.

The scanner 10 may be operated as follows to scan an object (not shown) positioned adjacent the front side 24 of the transparent platen 14. Assuming that the operator (not shown) has attended to all the preliminary matters that may be required by the particular scanner operating system, the operator may proceed by selecting the desired scanning resolution. In the case of the embodiment shown and described herein, the operator may select between the low resolution setting (e.g., available by using the first optical wave guide bundle 26) and the high resolution setting (e.g., available by using the second optical wave guide bundle 28). Once the operator has selected the desired resolution, the optical wave guide selection apparatus 58 operates the light output end actuator 62 as necessary to move the light output ends 40 and 50 of the optical wave guide bundles 26 and 28 so that the light output end 40, 50 corresponding to the selected scan resolution is aligned with the linear light sensitive array 74 of the detector 30.

For example, if the operator selects the low resolution setting, the light output end actuator 62 positions the light output ends 40 and 50 so that the light output end 40 is aligned with the linear array 74 of detector 30. Alternatively, if the operator selects the high resolution setting, the light output end actuator 62 positions the light output ends 40 and 50 so that the light output end 50 is aligned with the linear array 74 of detector 30. Thereafter, the object may be scanned by activating the illumination system 20 and by moving the carriage assembly 16 in the scan direction to scan the object positioned on the platen 14. The image data signal 60 produced by the detector 30 may be processed, if desired, by the image data pre-processing system 64 (FIG. 8) to produce selected image data 68 suitable for subsequent processing by a suitable image data processing system, such as a computer (not shown). The selected image data 68 corresponds to the particular scanning resolution selected by the operator.

Figure 9:
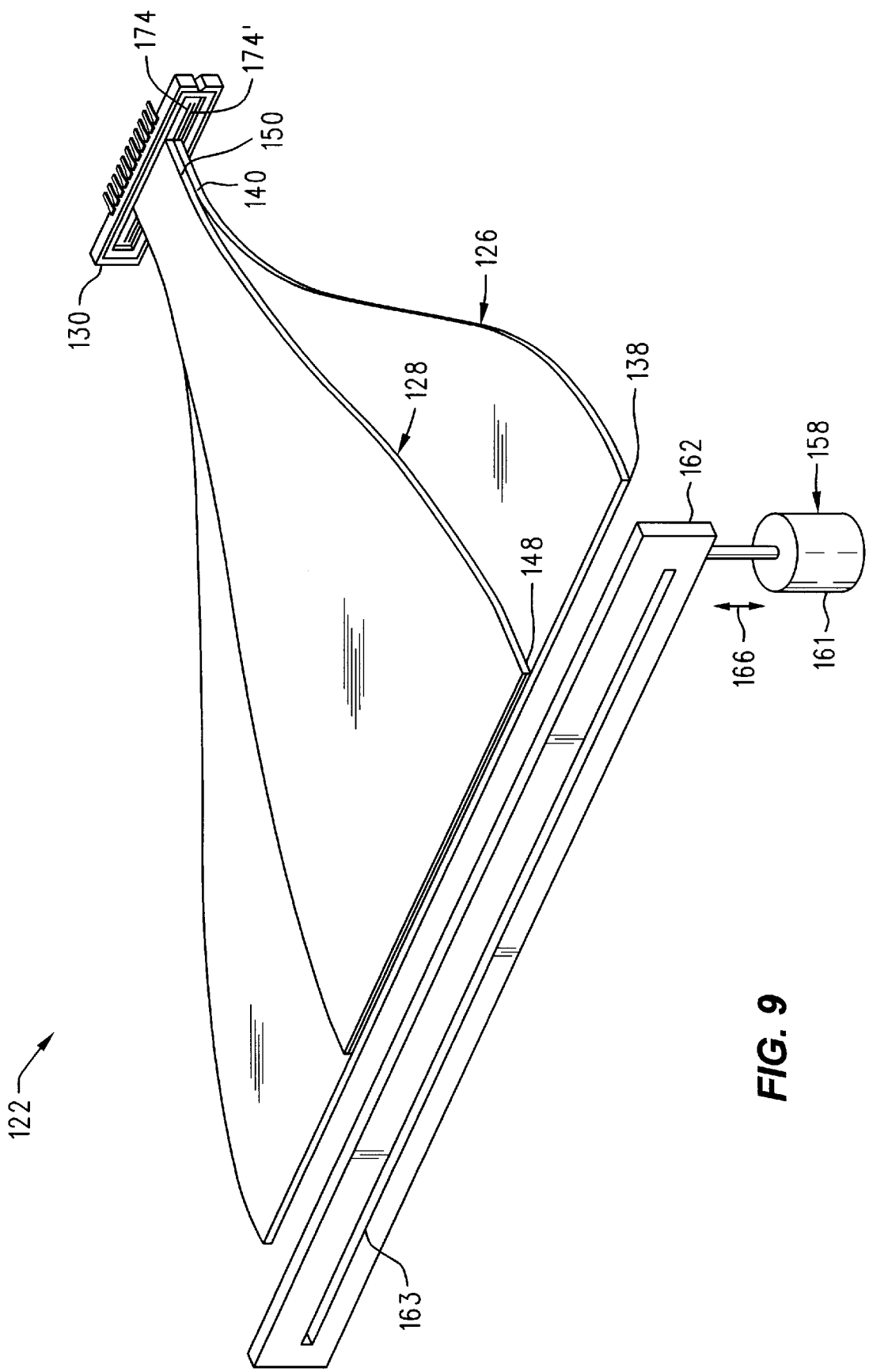
FIG. 9 is a perspective view of a second embodiment of an optical system having a moveable slit aperture assembly for selectively exposing the light input ends of the first and second optical wave guide bundles to the object being scanned.

A second embodiment 122 of the optical system is shown in FIG. 9. The second embodiment 122 of the optical system differs from the first embodiment of the optical system 22 described above in that the optical wave guide selection apparatus 158 comprises a moveable slit aperture assembly 162 positioned adjacent the linear light input ends 138, 148 of the first and second optical wave guide bundles 126 and 128. The second embodiment 122 also includes a detector 130 having two separate arrays 174 and 174' of light sensitive elements. The moveable slit aperture assembly 162 selectively exposes either the linear light input end 138 of the first optical wave guide bundle 126 or the linear light input end 148 of the second optical wave guide bundle 128 to the illuminated scan line, while at the same time occluding the non-selected light input end. As a result, only one of the two linear arrays 174, 174' of photosensitive elements of the detector 130 will produce an output signal. That output signal may thereafter be processed by an image data pre-processing system (e.g., 64) in the manner already described for the first embodiment.

The first and second optical wave guide bundles 126 and 128 utilized in the second embodiment 122 of the optical system may be essentially identical to the first and second optical wave guide bundles 26 and 28 described above. However, the detector 130 utilized in the second embodiment 122 differs from the detector 30 utilized in the first embodiment in that the detector 130 is provided with a first linear array 174 of light sensitive elements and a second linear array 174' of light sensitive elements. The configuration is such that each linear array of light sensitive elements 174, 174' is aligned with a linear light output end 140, 150 of the first and second optical wave guide bundles 126 and 128. For example, in the embodiment shown in FIG. 9, the first linear array 174 is aligned with the light output end 150 of the second optical wave guide bundle 128. The second linear array 174' is aligned with the light output end 140 of the first optical wave guide bundle 126.

In one preferred embodiment, both the first and second linear arrays 174 and 174' may comprise the same number of light sensitive elements, in which case the resolution difference is due entirely to the different reduction ratios of the two optical wave guide bundles 126 and 128. However, in an alternative embodiment, the two linear arrays 174 and 174' may be provided with different numbers of light sensitive elements having different pitches or spacings. If so, then the resolution difference will be due in part to the different reduction ratios of the two optical wave guide bundles 126 and 128 and in part to the differences between the number and pitch of the various light sensitive elements comprising the first and second linear arrays 174 and 174'.

The moveable slit aperture assembly 162 may be positioned adjacent the light input ends 138 and 148 of the corresponding first and second optical wave guide bundles 126 and 128 in the manner best seen in FIG. 9. The moveable slit aperture assembly 162 may be provided with an elongate slot 163 sized to expose only one of the two light input ends 138, 148 to image light (not shown) from the illuminated scan region on the object being scanned. The moveable slit aperture assembly 162 substantially occludes the other, non-selected light input end 138, 148 so that it does not receive any image light.

The moveable slit aperture assembly 162 may be moved in the direction of arrow 166 by a suitable actuator 161 which may be connected to the moveable slit aperture assembly 162 by any convenient arrangement. Accordingly, selection of a desired scan resolution (e.g., either a high or low resolution) will cause the actuator 161 to move the slit aperture assembly 162 in the direction of arrow 166 to expose the light input end 138, 148 of the optical wave guide bundle 126, 128 that corresponds to the selected scan resolution. For example, if the operator selects a low resolution scan, the actuator 161 will move the moveable slit aperture assembly 162 to the lower position so that the elongate slot 163 is substantially aligned with the light input end 138 of the first optical wave guide bundle 126. The slit aperture assembly 162 therefore exposes the light input end 138 to image light while substantially occluding the light input end 148 of the second optical wave guide bundle 128, thereby preventing it from receiving any image light. The second linear array 174' of light sensitive elements on the detector 130 will therefore produce an image data signal related to the image light received by the light input end 138 of first optical wave guide bundle 126. The first linear array 174 of the detector 130 will receive substantially no image light since the light input end 148 of the second optical wave guide bundle 128 is substantially occluded by the slit aperture assembly 162.

Alternatively, if the operator selects a high resolution scan, the actuator 161 will move the moveable slit aperture assembly 162 to the upper position so that the elongate slot 163 is substantially aligned with the light input end 148 of the second optical wave guide bundle 128. In this configuration, the slit aperture assembly 162 exposes the light input end 148 of the second optical wave guide bundle 128 to image light while substantially occluding the light input end 138 of the first optical wave guide bundle 126. Consequently, the first linear array 174 of detector 130 produces an image data signal, whereas the second linear array 174' does not.

Figure 10:
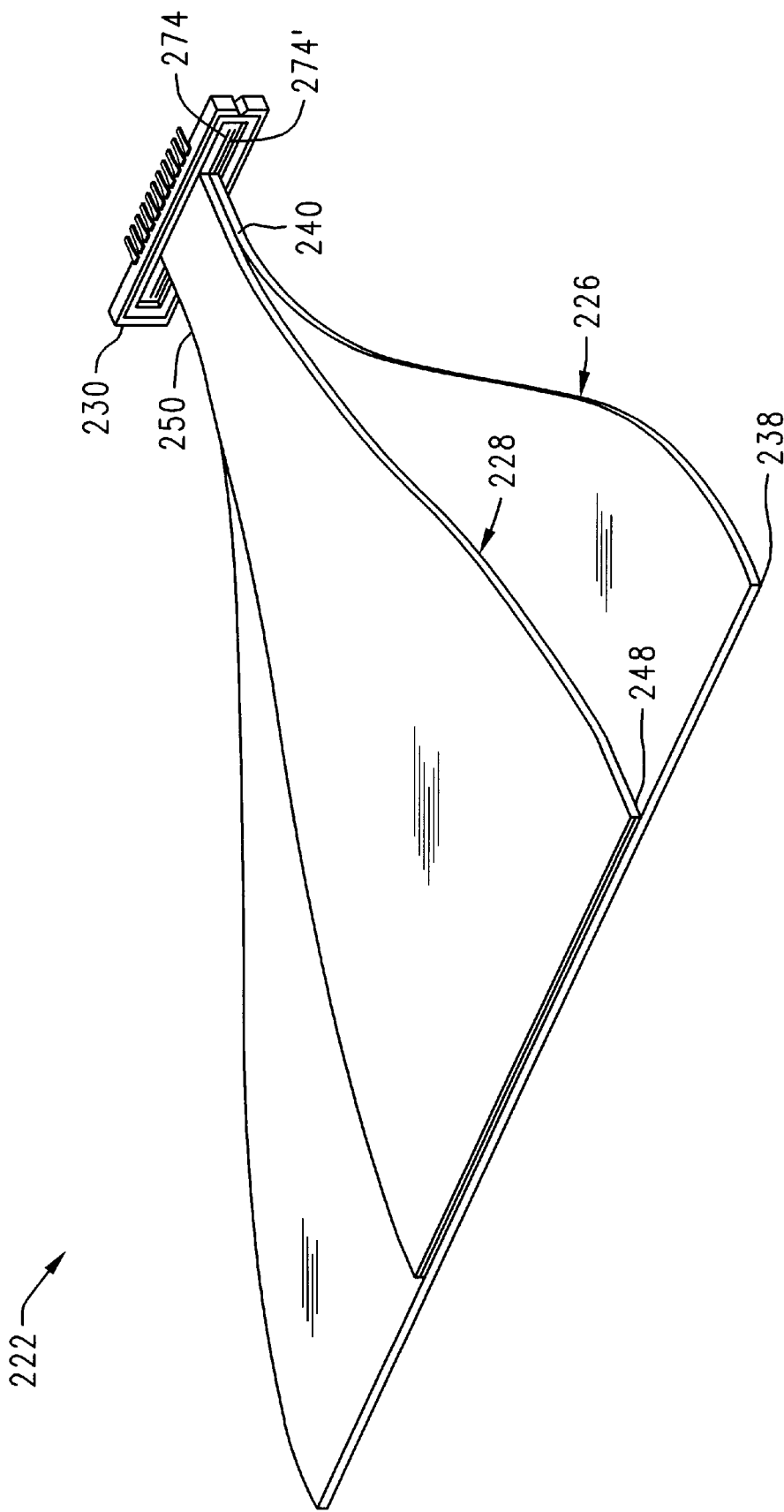
FIG. 10 is a perspective view of a third embodiment of an optical system having first and second optical wave guide bundles.

A third embodiment 222 of an optical system is shown in FIG. 10 and may comprise first and second optical wave guide bundles 226 and 228. The first optical wave guide bundle 226 may be essentially identical to the first optical wave guide bundles 26 and 126 described above and may include a light input end 238 and a light output end 240. The second optical wave guide bundle 228 may also be essentially identical to the second optical wave guide bundles 28 and 128 described above and may include a light input end 248 and a light output end 250. The third embodiment 222 of the optical system may also include a detector assembly 230 having a first linear array 274 of light sensitive elements and a second linear array 274' of light sensitive elements. The two linear arrays 274 and 274' may be aligned with the two light output ends 250 and 240, respectively.

Figure 11:
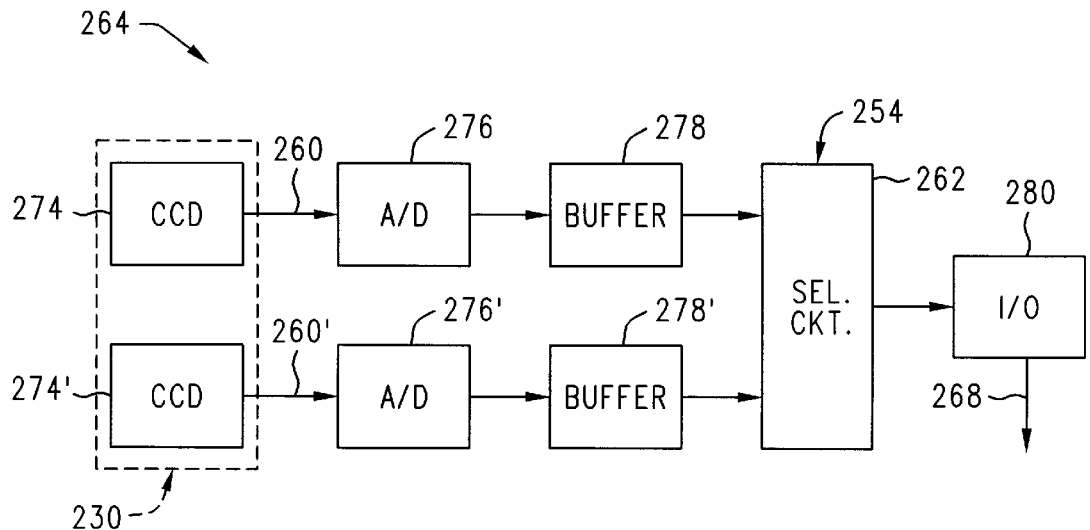
FIG. 11 is a block diagram of a second embodiment of an image data pre-processing system.

The optical wave guide selection apparatus 254 that may be utilized with the third embodiment 222 is shown in FIG. 11 and may comprise an electronic circuit implementation to perform the selection process, as opposed to the mechanical implementation that was described above for the other embodiments. More specifically, the optical wave guide selection apparatus 254 may comprise a portion of the image data pre-processing circuit 264 and may include an image data signal selection circuit 262 for selecting between the image data 260 produced by the two linear arrays 274 and 274' of detector 230. The image data pre-processing circuit 264 may comprise a pair of A/D converters 276 and 276' connected to the linear arrays 274 and 274', respectively, associated with the detector 230. See also FIG. 10. A pair of buffers 278 and 278' may be connected between the A/D converters 276 and 276' and the image data signal selection circuit 262. An input/output (I/O) circuit connected to the image data signal selection circuit 262 produces selected image data 268 representative of the scanned object at the selected resolution.

Operation of the image data signal selection circuit 262 is relatively straightforward. Specifically, the image data signal selection circuit 262 passes to the I/O circuit 280 only image data produced by the linear arrays 274, 274' that correspond to the selected optical wave guide bundle 226, 228, thus the selected scan resolution.

Figure 12:
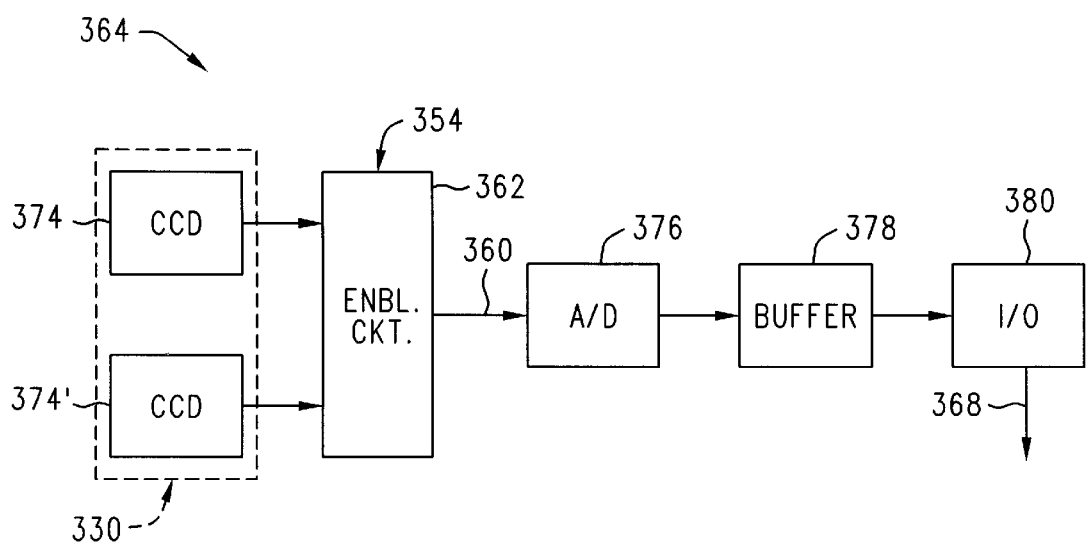
FIG. 12 is a block diagram of a third embodiment of an image data pre-processing system.

In an alternative implementation, an image data preprocessing circuit 364 substantially as shown in FIG. 12 may also be used in conjunction with the optical system 222 illustrated in FIG. 10 in order to produce selected image data 368 representative of the scanned object at the desired resolution. In the alternative implementation shown in FIG. 12, the optical wave guide selection apparatus 354 may include a detector enabling circuit 362 for enabling the linear array 374, 374' of the detector 330 that corresponds to the optical wave guide bundle for the selected resolution. The detector enabling circuit 362 passes image data 360 to the A/D converter 376, buffer 378 and I/O circuit 380 that originated from only the selected linear array. The I/O circuit 380 therefore produces selected image data 368 that is representative of the scanned object at the selected resolution.

It is contemplated that the inventive concepts herein described may be variously otherwise embodied and it is intended that the appended claims be construed to include alternative embodiments of the invention except insofar as limited by the prior art.

What is claimed is:

1. A scanner device for scanning an object, comprising:
a first optical wave guide bundle having a light input end and a light output end, the light input end of said first optical wave guide bundle being arranged to receive image light from the object being scanned, said first optical wave guide bundle having a first reduction ratio associated therewith;
a second optical wave guide bundle having a light input end and a light output end, the light input end of said second optical wave guide bundle being arranged to receive image light from the object being scanned, said second optical wave guide bundle having a second reduction ratio associated therewith, the second reduction ratio being different than the first reduction ratio;
a detector positioned adjacent the light output ends of said first and second optical wave guide bundles for receiving image light from the light output ends and for producing an image data signal related to image light received from the light output ends; and
optical wave guide selection apparatus operatively associated with said scanner device for selecting an optical wave guide bundle, the image light from which is used by said detector to produce the image data signal.

2. The scanner device of claim 1, wherein light input end of said first optical wave guide bundle is positioned adjacent the light input end of said second optical wave guide bundle.

3. The scanner device of claim 2, further comprising carriage apparatus associated with the light input ends of said first and second optical wave guide bundles for moving the light input ends of said first and second optical wave guide bundles relative to the object being scanned.

4. The scanner device of claim 2, wherein said first optical wave guide bundle comprises a plurality of wave guide elements, each of said plurality of wave guide elements having a light input end and a light output end, the light input ends of said plurality of wave guide elements being substantially coplanar with a first light input plane and arranged adjacent one another in a generally linear configuration so that the light input ends define a first light input line contained within said first light input plane, the light output ends of said plurality of wave guide elements being substantially coplanar with a first light output plane and arranged adjacent one another in a generally linear configuration so that the light output ends define a first light output line contained within said first light output plane.

5. The scanner device of claim 4, wherein said second optical wave guide bundle comprises a plurality of wave guide elements, each of said plurality of wave guide elements having a light input end and a light output end, the light input ends of said plurality of wave guide elements being substantially coplanar with a second light input plane and arranged adjacent one another in a generally linear configuration so that the light input ends define a second light input line contained within said second light input plane, the light output ends of said plurality of wave guide elements being substantially coplanar with a second light output plane and arranged adjacent one another in a generally linear configuration so that the light output ends define a second light output line contained within said second light output plane.

6. The scanner device of claim 5, wherein said first light input plane and said second light input plane are substantially co-planar and wherein said first light output plane and said second light output plane are substantially co-planar.

7. The scanner device of claim 6, wherein a length of said first light input line is greater than a length of said second light input line and wherein a length of said first light output line is substantially equal to a length of said second light output line.

8. The scanner device of claim 1, wherein the first reduction ratio is in the range of about 5.3:1 to about 12.1:1.

9. The scanner device of claim 1, wherein the second reduction ratio is in the range of about 2.64:1 to about 6:1.

10. The scanner device of claim 1, wherein said detector comprises an array of light sensitive elements for receiving image light from one of the light output ends of said first and second optical wave guide bundles and wherein said optical wave guide selection apparatus comprises a light output end actuator connected to the light output ends of said first and second optical wave guide bundles for moving the light output ends of said first and second optical wave guide bundles relative to said detector so that a selected light output end of said first and second optical wave guide bundle is aligned with said array of light sensitive elements of said detector.

11. The scanner device of claim 1, wherein said detector comprises a first array of light sensitive elements aligned to receive image light from the light output end of said first optical wave guide bundle, said first array of light sensitive elements producing a first image data signal related to image light received from the light output end of said first optical wave guide bundle and a second array of light sensitive elements aligned to receive image light from the light output end of said second optical wave guide bundle, said second array of light sensitive elements producing a second image data signal related to image light received from the light output end of said second optical wave guide bundle, and wherein said optical wave guide selection apparatus comprises a moveable slit aperture assembly having an elongate slit therein positioned adjacent the light input ends of said first and second optical wave guide bundles, said slit aperture assembly substantially exposing the light input end of said first optical wave guide bundle to the object being scanned and substantially occluding the light input end of said second optical wave guide bundle when said slit aperture assembly is in a first position, said slit aperture assembly substantially exposing the light input end of said second optical wave guide bundle to the object being scanned and substantially occluding the light input end of said first optical wave guide bundle when said slit aperture assembly is in a second position.

12. The scanner device of claim 1, wherein said detector comprises a first array of light sensitive elements aligned to receive image light from the light output end of said first optical wave guide bundle, said first array of light sensitive elements producing a first image data signal related to image light received from the light output end of said first optical wave guide bundle and a second array of light sensitive elements aligned to receive image light from the light output end of said second optical wave guide bundle, said second array of light sensitive elements producing a second image data signal related to image light received from the light output end of said second optical wave guide bundle, and wherein said optical wave guide selection apparatus comprises light sensitive array enablement apparatus operatively associated with said detector for enabling a selected one of said first and second arrays of light sensitive elements so that the selected one of said first and second arrays produces a corresponding image data signal.

13. The scanner device of claim 1, wherein said detector comprises a first array of light sensitive elements aligned to receive image light from the light output end of said first optical wave guide bundle, said first array of light sensitive elements producing a first image data signal related to image light received from the light output end of said first optical wave guide bundle and a second array of light sensitive elements aligned to receive image light from the light output end of said second optical wave guide bundle, said second array of light sensitive elements producing a second image data signal related to image light received from the light output end of said second optical wave guide bundle, and wherein said optical wave guide selection apparatus comprises image data signal selection apparatus operatively associated with said detector for selecting one of said first and second image data signals for subsequent processing.

14. A scanner device for scanning an object, comprising:
a first optical wave guide bundle having a light input end and a light output end, the light input end of said first optical wave guide bundle being arranged to receive image light from the object being scanned, said first optical wave guide bundle having a first reduction ratio associated therewith;
a second optical wave guide bundle having a light input end and a light output end, the light input end of said second optical wave guide bundle being arranged to receive image light from the object being scanned, said second optical wave guide bundle having a second reduction ratio associated therewith, the second reduction ratio not equal to the first reduction ratio;
a detector for receiving image light from one of the light output ends of said first and second optical wave guide bundles and for producing an image data signal related to image light received from the light output end; and
a light output end actuator connected to the light output ends of said first and second optical wave guide bundles for moving the light output ends of said first and second optical wave guide bundles relative to said detector so that a selected light output end of said first and second optical wave guide bundle is aligned with said detector.

15. A scanner device for scanning an object, comprising:
a first optical wave guide bundle having a light input end and a light output end, the light input end of said first optical wave guide bundle being arranged to receive image light from the object being scanned, said first optical wave guide bundle having a first reduction ratio associated therewith;
a second optical wave guide bundle having a light input end and a light output end, the light input end of said second optical wave guide bundle being arranged to receive image light from the object being scanned, said second optical wave guide bundle having a second reduction ratio associated therewith, the second reduction ratio being different than the first reduction ratio;
a first array of light sensitive elements aligned to receive image light from the light output end of said first optical wave guide bundle, said first array of light sensitive elements producing a first image data signal related to image light received from the light output end of said first optical wave guide bundle;
a second array of light sensitive elements aligned to receive image light from the light output end of said second optical wave guide bundle, said second array of light sensitive elements producing a second image data signal related to image light received from the light output end of said second optical wave guide bundle; and
a moveable slit aperture assembly having an elongate slit therein positioned adjacent the light input ends of said first and second optical wave guide bundles, said slit aperture assembly substantially exposing the light input end of said first optical wave guide bundle to the object being scanned and substantially occluding the light input end of said second optical wave guide bundle when said slit aperture assembly is in a first position, said slit aperture assembly substantially exposing the light input end of said second optical wave guide bundle to the object being scanned and substantially occluding the light input end of said first optical wave guide bundle when said slit aperture assembly is in a second position.

16. A scanner device for scanning an object, comprising:
a first optical wave guide bundle having a light input end and a light output end, the light input end of said first optical wave guide bundle being arranged to receive image light from the object being scanned, said first optical wave guide bundle having a first reduction ratio associated therewith;
a second optical wave guide bundle having a light input end and a light output end, the light input end of said second optical wave guide bundle being arranged to receive image light from the object being scanned, said second optical wave guide bundle having a second reduction ratio associated therewith, the second reduction ratio being different than the first reduction ratio;
a first array of light sensitive elements aligned to receive image light from the light output end of said first optical wave guide bundle, said first array of light sensitive elements producing a first image data signal related to image light received from the light output end of said first optical wave guide bundle;
a second array of light sensitive elements aligned to receive image light from the light output end of said second optical wave guide bundle, said second array of light sensitive elements producing a second image data signal related to image light received from the light output end of said second optical wave guide bundle; and
light sensitive array enablement apparatus operatively associated with said first and second arrays of light sensitive elements for enabling a selected one of said first and second arrays of light sensitive elements so that the selected one of said first and second arrays of light sensitive elements produces a corresponding image data signal.

17. A scanner device for scanning an object, comprising:

a first optical wave guide bundle having a light input end and a light output end, the light input end of said first optical wave guide bundle being arranged to receive image light from the object being scanned, said first optical wave guide bundle having a first reduction ratio associated therewith;

a second optical wave guide bundle having a light input end and a light output end, the light input end of said second optical wave guide bundle being arranged to receive image light from the object being scanned, said second optical wave guide bundle having a second reduction ratio associated therewith, the second reduction ratio being different than the first reduction ratio;

a first array of light sensitive elements aligned to receive image light from the light output end of said first optical wave guide bundle, said first array of light sensitive elements producing a first image data signal related to image light received from the light output end of said first optical wave guide bundle;

a second array of light sensitive elements aligned to receive image light from the light output end of said second optical wave guide bundle, said second array of light sensitive elements producing a second image data signal related to image light received from the light output end of said second optical wave guide bundle; and image data signal selection apparatus operatively associated with said first and second arrays of light sensitive elements for selecting one of said first and second image data signals for subsequent processing.

18. A method for scanning an object, comprising:

providing a first optical wave guide bundle having a light input end and a light output end, the light input end of said first optical wave guide bundle being arranged to receive image light from the object being scanned, said first optical wave guide bundle having a first reduction ratio associated therewith;

providing a second optical wave guide bundle having a light input end and a light output end, the light input end of said second optical wave guide bundle being arranged to receive image light from the object being scanned, said second optical wave guide bundle having a second reduction ratio associated therewith, the second reduction ratio being different than the first reduction ratio;

positioning the light input ends of the first and second optical wave guide bundles adjacent the object so that they receive image light therefrom;

detecting image light from a selected one of the output ends of said first and second optical wave guide bundles; and producing an image data signal responsive to the detected image light.

19. A method for scanning an object, comprising:

providing a first optical wave guide bundle having a light input end and a light output end, the light input end of said first optical wave guide bundle being arranged to receive image light from the object being scanned, said first optical wave guide bundle having a first reduction ratio associated therewith;

providing a second optical wave guide bundle having a light input end and a light output end, the light input end of said second optical wave guide bundle being arranged to receive image light from the object being scanned, said second optical wave guide bundle having a second reduction ratio associated therewith, the second reduction ratio being different than the first reduction ratio;

positioning the light input ends of the first and second optical wave guide bundles adjacent the object so that they receive image light therefrom;

detecting image light from the output ends of said first and second optical wave guide bundles;

producing a first image data signal responsive to image light received from the light output end of said first optical wave guide bundle;

producing a second image data signal responsive to image light received from the light output end of said second optical wave guide bundle; and selecting one of said first and second image data signals for subsequent processing.

* * * * *